(12) United States Patent
Peng et al.

(10) Patent No.: US 9,081,555 B2
(45) Date of Patent: Jul. 14, 2015

(54) METHOD AND APPARATUS FOR CURRENT DERATING WITH INTEGRATED TEMPERATURE SENSING

(75) Inventors: Xinli Peng, Chandler, AZ (US); Troy Stockstad, Chandler, AZ (US); Ricardo T. Goncalves, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/548,467

(22) Filed: Jul. 13, 2012

(65) Prior Publication Data

US 2014/0015446 A1    Jan. 16, 2014

(51) Int. Cl.
    *H05B 33/08*      (2006.01)
    *G06F 1/20*      (2006.01)
    *G06F 1/32*      (2006.01)

(52) U.S. Cl.
    CPC .............. *G06F 1/206* (2013.01); *G06F 1/3215* (2013.01); *G06F 1/3296* (2013.01); *H05B 33/089* (2013.01); *H05B 33/0854* (2013.01); *Y02B 60/1285* (2013.01)

(58) Field of Classification Search
None
See application file for complete search history.

(56) References Cited

U.S. PATENT DOCUMENTS

| | | | |
|---|---|---|---|
| 5,886,515 A * | 3/1999 | Kelly | 323/313 |
| 7,119,498 B2 | 10/2006 | Baldwin et al. | |
| 7,262,752 B2 | 8/2007 | Weindorf | |
| 7,626,346 B2 * | 12/2009 | Scilla | 315/309 |
| 7,646,028 B2 | 1/2010 | Russell et al. | |
| 7,812,553 B2 * | 10/2010 | Kang et al. | 315/309 |
| 7,962,030 B2 * | 6/2011 | Trevelyan | 396/158 |
| 8,278,845 B1 * | 10/2012 | Woytowitz | 315/307 |
| 2010/0194368 A1 | 8/2010 | Taylor et al. | |
| 2011/0043185 A1 | 2/2011 | Kim | |

FOREIGN PATENT DOCUMENTS

| | | |
|---|---|---|
| EP | 1278402 A1 | 1/2003 |
| JP | 2008269868 A | 11/2008 |

OTHER PUBLICATIONS

EPCOS Application Note, "No chance of heat death," PTC thermistors as current limiters for LEDs, EPCOS AG, Components The Customer Magazine, http://www.epcos.com/web/generator/Web/Sections/Components/Page,locale=en,r=263282,a=305984.html, pp. 1-4, Sep. 2006.

(Continued)

*Primary Examiner* — Douglas W Owens
*Assistant Examiner* — Dedei K Hammond

(57) ABSTRACT

A method and apparatus for derating current and for derating current for a camera flash. The method comprises monitoring a local junction temperature of a module. The local junction temperature is converted into a local junction current. The local junction current is then compared with a reference current, which is independent of temperature. After the current comparison and subtraction is made, a derate control current is obtained to generate the LED reference current. After the temperature crosses the temperature threshold, the derate control current is derated. Both the temperature threshold and current derate slope are programmable and precisely controlled. The LED output current is regulated and proportional to the LED reference current. If the local junction temperature is greater than the temperature threshold, the LED output current is derated at the moment of the camera flash to avoid thermal overload.

9 Claims, 5 Drawing Sheets

(56) References Cited

OTHER PUBLICATIONS

International Search Report and Written Opinion—PCT/US2013/050379—ISA/EPO—Oct. 11, 2013.

Maxim Integrated Products: "MAX8607-1 MHz PWM Boost Converter for 1.5A White LED Camera Flash", Feb. 2007, XP002713022.

* cited by examiner

CURRENT DERATE METHOD WITH INTEGRATED TEMPERATURE SENSING

CURRENT DERATE BLOCK DIAGRAM WITH NTC TEMPERATURE SENSING

METHOD AND APPARATUS FOR CURRENT DERATING WITH INTEGRATED TEMPERATURE SENSING

BACKGROUND

1. Field

The present disclosure relates generally to power management integrated circuits, and more particularly, to current derating with integrated temperature sensing.

2. Background

Power management integrated circuits (PMIC) for mobile devices have grown in importance as the features and functions of mobile devices have increased. PMICs integrate various modules such as voltage regulators, battery chargers, drivers, audio amplifiers, and user interfaces, among other features. Many of these modules dissipate considerable power and are frequently turned on at the same time, causing elevated chip temperatures. Elevated chip temperatures may cause thermal shutdown and other problems if not properly managed. Current PMICs incorporate a temperature alarm module that monitors the PMIC temperature and sends out interrupts as needed, depending on the temperature and threshold.

Power dissipation prediction and thermal management is made more complex by the concurrent operation of multiple modules, each of which generates an additional thermal load. A practical method for addressing the thermal loading problem is to limit, or derate, power consumption of modules such as the Flash LED and audio amplifier when those modules are operating in an elevated thermal condition, or generating more heat that must be dissipated. Existing PMIC temperature alarms output a voltage measurement, which must be converted to current before being used in a current derating operation. This current derating operation may require a large look-up table in order to provide a smooth derating of the current. In addition, the temperature alarm sensor may be physically located far away from the LED module and this distance may also cause error in the derating temperature threshold for the Flash Module.

There is a need in the art for a method and apparatus to implement thermal sensing and management in modules such as the Flash LED module and implement current derating with integrated temperature management, while avoiding errors in latency and current derating. In addition, there is a need in the art for a method and apparatus that provides automatic and smooth temperature derating, flexible derating control, compact design, and low cost.

SUMMARY

Embodiments disclosed herein provide a method and apparatus for derating current. The method comprises monitoring a local junction temperature of a module. The local junction temperature is converted into a local junction current. The local junction current is a function of the local junction temperature. The next step in the method involves comparing the local junction current with a reference current, which can be independent of temperature or a function of a reference temperature. After the comparison is made, if the local junction current is greater than the reference current, the local junction current is derated to prevent thermal overloading.

A further embodiment provides an apparatus for derating current. The apparatus incorporates a temperature sensor, a current reference generator, a current comparator, a derating control generator, and a light emitting diode (LED) current driver.

A still further embodiment provides an apparatus for current derating. The apparatus comprises: means for monitoring a local junction temperature of a module; means for converting the local junction temperature into a local junction current, wherein the local junction current is a function of the local junction temperature. The apparatus also includes means for comparing the local junction current with a reference current, wherein the reference current can be independent of temperature or a function of the reference temperature and means for subtracting the reference current from the local junction current. The apparatus then provides means for derating the local junction current if the local junction current is greater than the reference current.

Yet a further embodiment provides a method for derating a camera flash. The method includes the steps of monitoring a local junction temperature of a module; converting the local junction temperature into a local junction current, wherein the local junction current is a function of the local junction temperature; comparing the local junction current with a reference current, wherein the reference current can be independent of temperature or a function of the local junction temperature and subtracting the reference current from the local junction current. In addition, the method determines the timing of a camera flash and derating the local junction current if the local junction current is greater than the reference current at the time of the camera flash.

A still further embodiment provides an apparatus for derating a camera flash. The apparatus comprises a temperature sensor, a current reference generator, a current comparator, a derating control generator, a processor for determining the timing of a camera flash, and a LED current driver.

An additional embodiment provides a non-transitory computer-readable medium that contains instructions for derating current, that when executed, cause a processor to perform the following steps: monitoring a local junction temperature of a module; converting the local junction temperature into a local junction current, wherein the local junction current is a function of the local junction temperature; comparing the local junction current with a reference current, wherein the reference current can be independent of temperature or a function of a reference temperature; subtracting the reference current from the local junction current; and derating the local junction current if the local junction current is greater than the reference current.

Yet a further embodiment provides a non-transitory computer-readable medium containing instructions for derating a current for a camera flash, which when executed cause a processor to perform the steps of: monitoring a local junction temperature of a module; converting the local junction temperature into a local junction current, wherein the local junction current is a function of the local junction temperature; comparing the local junction current with a reference current, wherein the reference current can be independent of temperature or a function of a reference temperature; subtracting the reference current from the local junction current; determining a timing of a camera flash; and derating the local current if the local junction current is greater than the reference current at the time of the camera flash.

DETAILED DESCRIPTION

Figure 1:
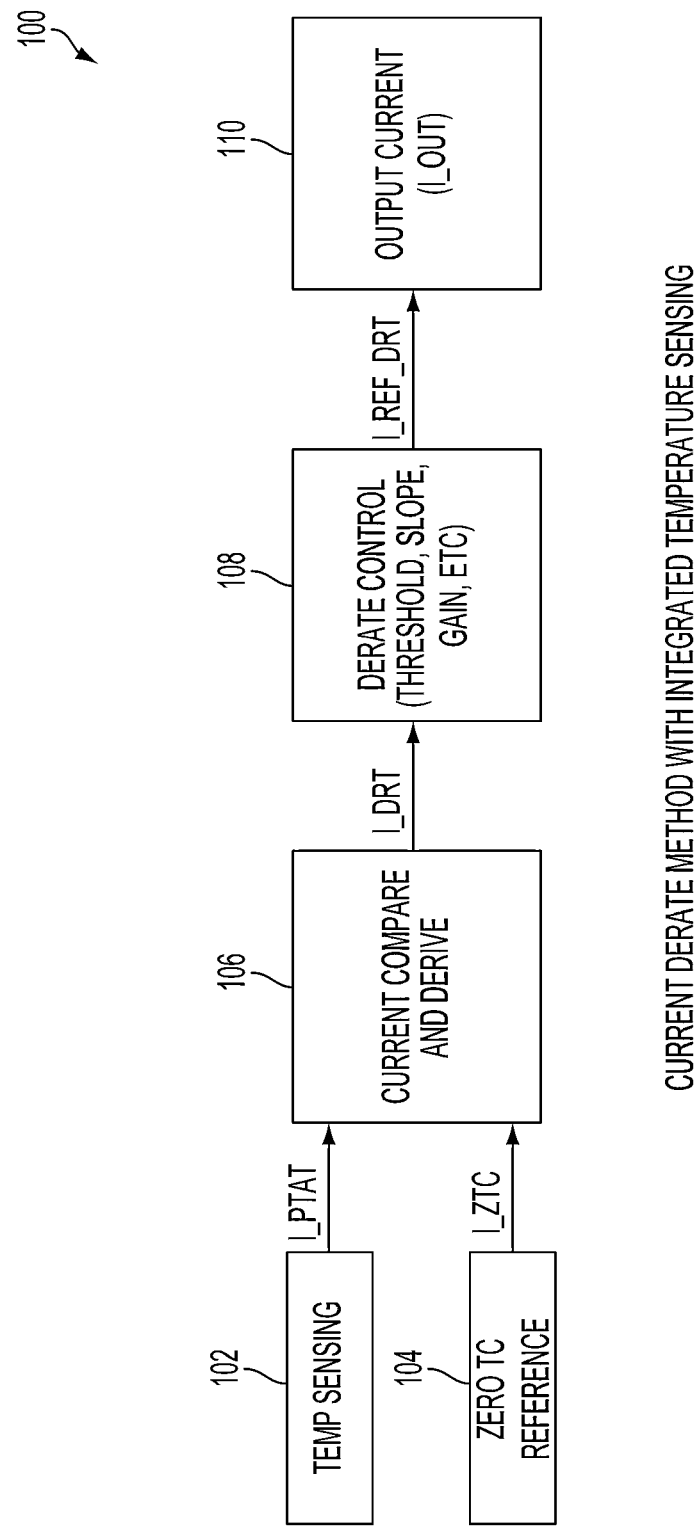
FIG. 1 illustrates a method of current derating with integrated temperature sensing according to an embodiment of the invention.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "$3^{rd}$ Generation Partnership Project" (3GPP). CDMA2000 is described in documents from an organization named "$3^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ration (PAPR) because of its inherent single carrier structure. SC-FDMA may be used in the uplink communications where the lower PAPR greatly benefits the mobile terminal in terms of transmit power efficiency.

PMICs for mobile devices often integrate various modules such as voltage regulators, battery chargers, drivers, audio amplifiers, and user interfaces, as well as other modules. Many of these modules dissipate large amounts of power and may be in operation at the same time, causing chip temperatures to rise. This rise in chip temperature may lead to a thermal shutdown if not properly managed. Concurrent power usage increases the difficulty of predicting total power dissipating and thermal management. A practical way to handle such potential thermal issues is to limit, or derate, the power consumption of the modules, such as Flash LED and audio amplifier, when in an elevated thermal condition.

A temperature alarm module in the PMIC monitors the entire PMIC temperature and sends out interrupts as needed. However, the output of the temperature alarm is a voltage and this voltage must be converted into current before it can be used for the Flash LED current derating, which may cause delay and latency of the derate response. Moreover, because the temperature alarm sensor may be located far from the LED module, errors in the derating temperature threshold setting may occur. As a result, it is desirable to implement thermal sensing and module management for modules such as Flash LED.

Current derating circuits with integrated temperature sensing typically utilize band-gap type circuits to generate a proportional to absolute temperature (PTAT) current which then serves as the junction temperature sensor. FIG. 1 illustrates the process.

FIG. 1 depicts the steps in the process of current derating with integrated temperature sensing. The method, 100, begins with the temperature sensing in step 102. In the temperature sensing step a proportional to absolute temperature (PTAT) based current is generated. PTAT serves as the junction temperature sensor. In step 104, a zero temperature coefficient (ZTC) current is generated. In step 106 the PTAT current is then compared against the ZTC current by subtraction to generate a derate control current, called I_derate, which is zero before the temperature threshold and then increases with increasing temperature after crossing the threshold. The threshold is controlled by the DC value of the ZTC current in step 108 where the I_derate current is then gained up and subtracted from a ZTC current in order to obtain the reference current used to generate the Flash LED output current used in step 110.

When the current is below the threshold, the LED current is a constant DC current. After the temperature crosses the temperature threshold, the LED current is derated at a designated rate, which is controlled the by I_derate gain ratio. The slope of the I_derate curve determines the temperature derate slope of the Flash LED current. Both the temperature threshold and current derate slope may be programmable and may be precisely controlled. The architecture may be extended to a fully digitalized temperature monitoring apparatus if an analog to digital converter (ADC) for additional current comparison is added.

Figure 2:
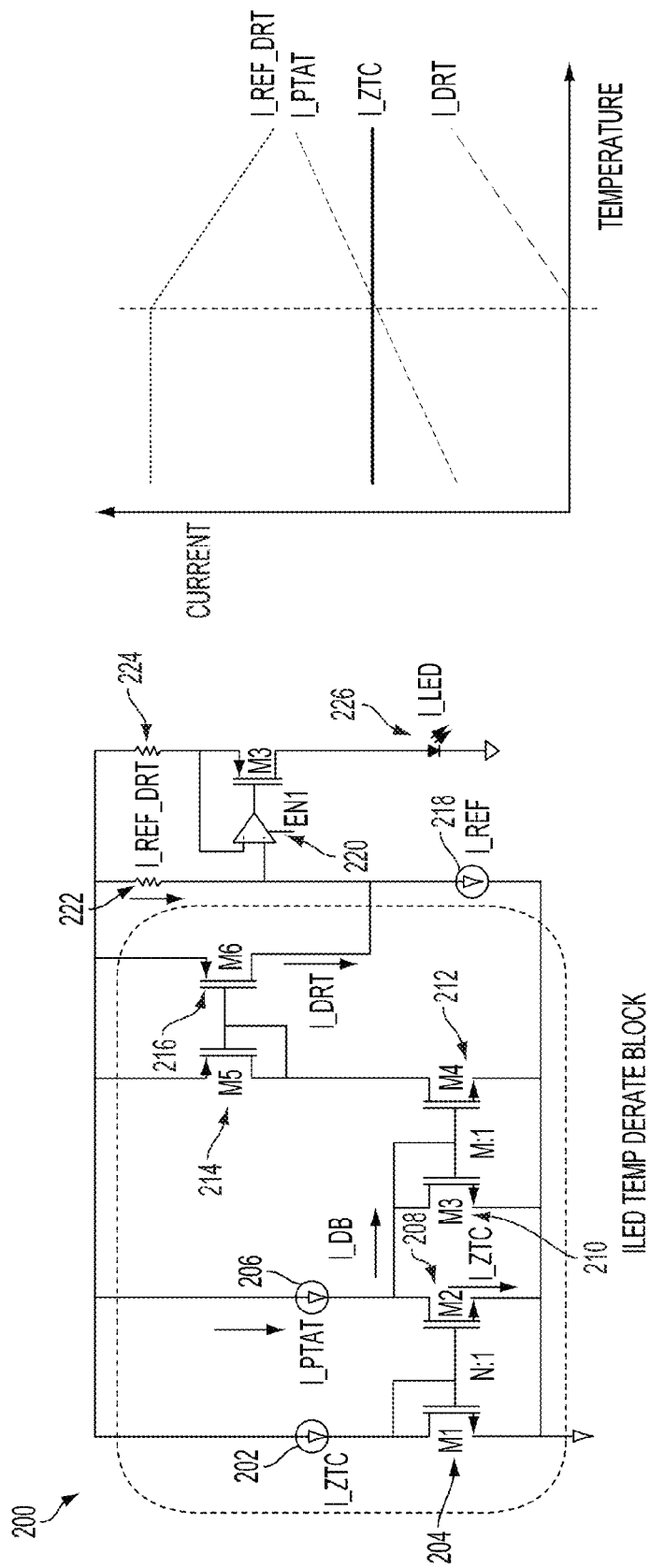
FIG. 2 is a block diagram of an apparatus for current derating with integrated temperature sensing according to an embodiment of the invention. (The previous FIG. 2 has 2 transistors called M3, the updated FIG. 2 has fixed this error)

FIG. 2 illustrates the apparatus used to generate the PTAT current and incorporates an integrated sensor for local junction temperature detecting. The assembly, 200 includes the elements described below. I_ZTC current is connected to transistor M1, item 204. Transistor 204 is coupled with transistor 208, M2. So I_ZTC current in Transistor 208 is compared with I_PTAT current 206 to get the derate current called I_DB, which flows into M3. Transistor M3, item 210 is coupled with transistor M4, item 212. Transistor 212 is also coupled with transistor 214, M5 and transistor M6, 216. From M3 to M4, and M5 to M6, current gain can be set up. The current I_DRT flows out of M6 is the derate control current which includes derate thresholds and slope info already, after the current comparing and gaining. I_DRT is connected to item 218 I_REF, to generate LED reference current I_REF_DRT. Resistors 222 and 224 are also connected with amplifier 220, which controls the main power FET to provide output current I_OUT to diode 226.

The apparatus operates as described below. The PTAT current, I_PTAT is compared with the ZTC current, I_ZTC and subtracted by the ZTC current in order to generate the derate control current, I_DRT. I_DRT smoothly converts the temperature into current. I_DRT, the derate control current is zero before the temperature threshold is reached and then increases with temperature after reaching the temperature threshold. The derating threshold may be adjusted by the value of I_ZTC. The derate slope may be tuned by the gain of the current mirror. Both the derate threshold and slope may be programmable. Current is used for derate control for simplicity and also to achieve instant derating with minimal delay. The derating threshold and derating slope may be programmed In a further embodiment, an analog to digital converter (ADC) may be incorporated. Incorporating an ADC allows for digitized temperature information to be obtained for processing.

An area of potential applicability for the current driver described above is a camera flash. As mobile devices become more popular more mobile devices incorporate camera systems into the mobile devices. The cameras incorporated into mobile devices have become more sophisticated with greater resolution, improved lenses, and features once found only on high end single lens reflex (SLR) cameras. One of the features incorporated into a mobile device camera is a flash. Flash photography requires a sudden brief and intense burst of light to illuminate the scene to be photographed. As a result, flash systems require significant current and may generate large amounts of heat in a short period of time. The heat produced by the flash may cause thermal overload of the PMIC at the moment of flash firing. The current driver described in the embodiment above provides current control for a flash LED that limits the current at high temperatures.

Figure 3:
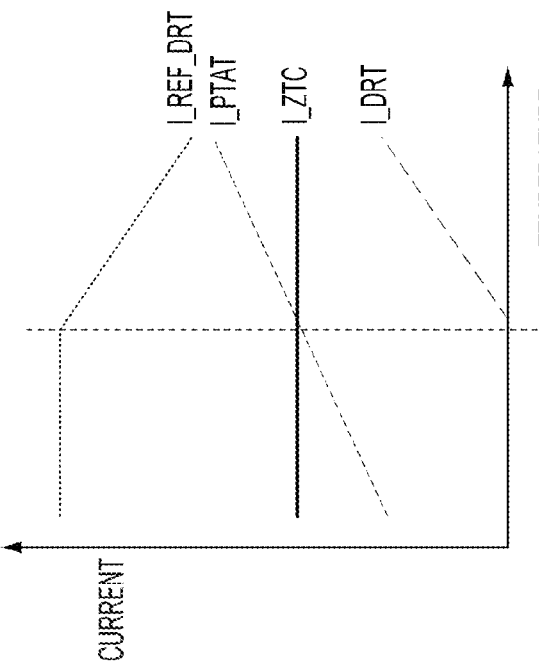
FIG. 3 illustrates a current profile produced using a method for current derating with integrated temperature sensing according to an embodiment of the invention.

FIG. 3 illustrates the current profile of an embodiment of the invention, specifically, the current profile of the apparatus illustrated in FIG. 2.

Figure 4:
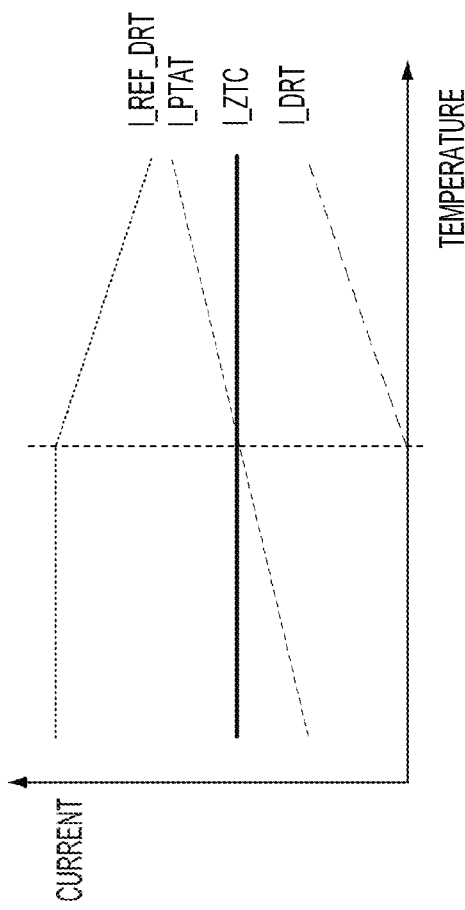
FIG. 4 depicts a current profile with adjustable derate threshold and slope produced using a method for current derating with integrated temperature sensing according to an embodiment of the invention. (The FIG. 4 in the previous document is not accurate, please see the updated FIG. 4 at the end of this document).

FIG. 4 illustrates the current profile with an adjustable derating threshold and slope. The derate threshold and slope are determined by the following equations:

$$I\_PTAT = I\_ZTC \quad (\text{equation 1})$$

$$I\_PTAT = [Kt/q * ln(A)]/R \quad (\text{equation 2})$$

$$I\_DRT = (I\_PTAT - I\_ZTC) * B \quad (\text{equation 3})$$

Figure 5:
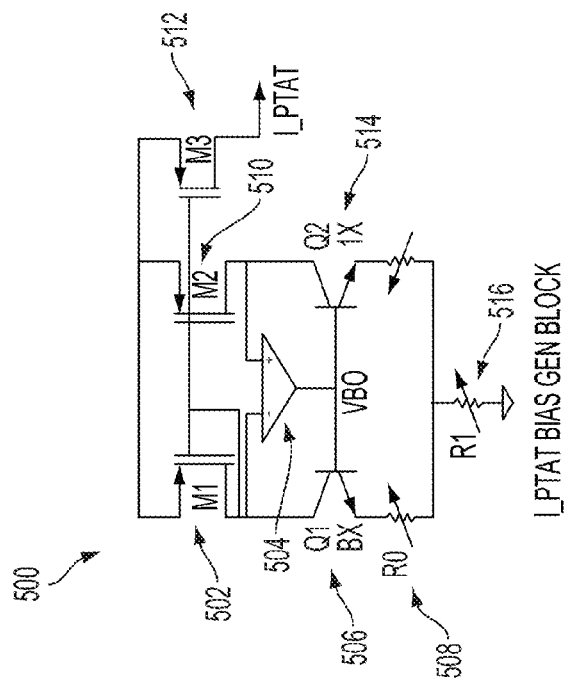
FIG. 5 shows the I_PTAT Bias Generation block of an embodiment according to an embodiment of the invention.

A is the ratio of current flowing into the bipolar transistor pair or the transistor's size ratio, see FIG. 5, B is the current gain. (equation 4)

FIG. 5 is a block diagram of and bandgap type I_PTAT bias generation block according to an embodiment of the invention. The assembly, 500 includes a MOS transistor M1 502 and an opamp 504. Opamp 504 is used to regulate the drain voltages of M1 502 and M2 510. The output of opamp 504 is connected to the base of NPN bipolar transistors 506 and 514. The output from transistor 506 is input to variable resistor 508. The output from variable resistor 508 and the output from transistor 514 are input to variable resistor 516. Transistor M1 502 is coupled with transistor M2, 510, which is coupled to transistor M3, 512. The output from transistor 510 is coupled to transistor 514. The output from transistor M3, 512 is the I_PTAT current.

Figure 6:
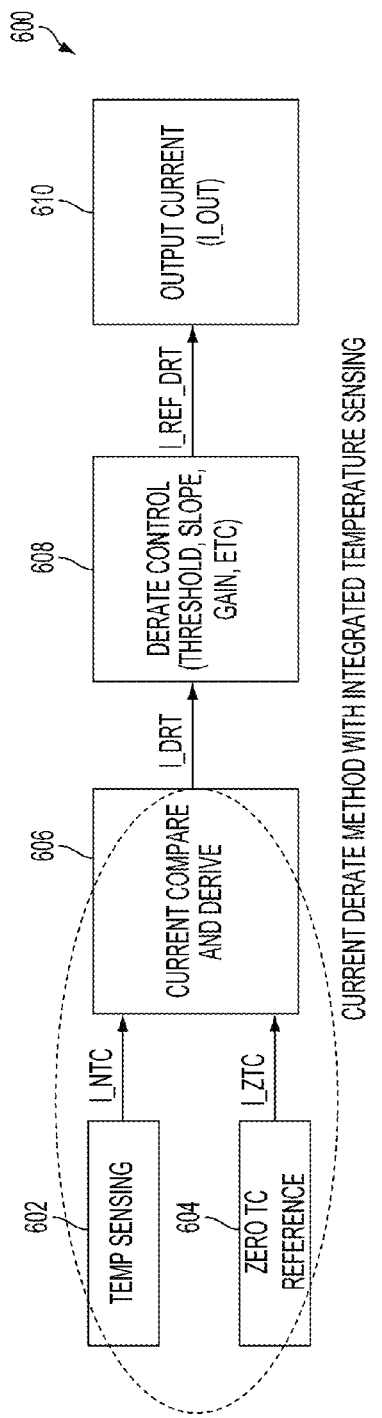
FIG. 6 illustrates an alternate embodiment of a current derate method with integrated NTC temperature sensing.

FIG. 6 illustrates an alternative embodiment of a method for current derating with integrated negative temperature coefficient (NTC) temperature sensing. A negative temperature coefficient (NTC) occurs when a physical property, such as thermal conductivity or electrical conductivity, of a material decreases with increasing temperature, typically in a defined range of temperatures. For most materials, conductivity decreases with increasing temperature.

In the method, 600, shown in FIG. 6 the temperature sensing operation, step 602 incorporates NTC temperature sensing to determine a rise in temperature. The output from step 602 is I_NTC, a current value reflecting the NTC temperature coefficient of the sensing material. In step 604 the ZTC reference current is generated and I_ZTC is output. Both I_NTC and I_ZTC are used in the current compare and derivation performed in step 606. The output of the current comparison and derivation is I_DRT, the derating current. The derating current I_DRT is input to the derating control device in step 608, where the threshold, slope, and gain, among other items are calculated and controlled. The output is a reference derating current I_REF_DRT which is input to the output determining block in step 610.

Figure 7:
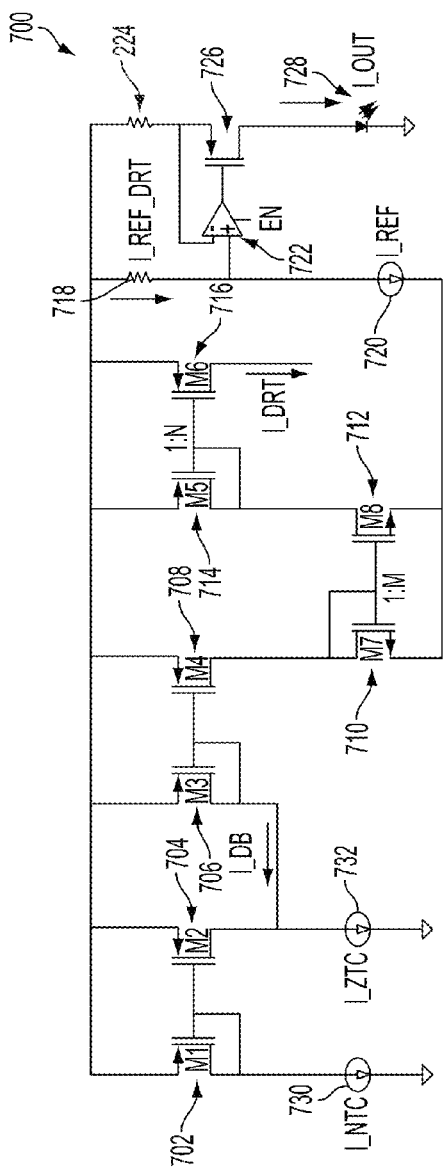
FIG. 7 illustrates an apparatus according to an alternate embodiment of a current derate method with NTC temperature sensing.

FIG. 7 is a block diagram of a further embodiment of a current derating apparatus that incorporates NTC temperature sensing. In the assembly 700, a P-channel MOSFET, M1, as item 702, is connected to I_NTC current 730. MOSFET 702 is also connected to MOSFET M2, item 704. MOSFET 704 is also connected to I_ZTC current, as item 732 and the MOSFET M3, as item 706. The current flows through MOSFET M3, is the result of I_ZTC subtracted by I_NTC. MOSFET M3, 706 is coupled to MOSFET M4, item 708. MOSFET M4 708 is coupled to MOSFET M7, item 710. MOSFET 710 is coupled to MOSFET M8, item 712. MOSFET M5, item 714 is coupled to MOSFET 710 and also to MOSFET M6, item 716. MOSFET 716 outputs the derate current, I_DRT. The derate current substracts to I_REF current 720 to generate I_REF_DRT. The voltage drops on resistors 718 and 714 are matched and regulated by opamp 722. The MOSFET 726 provides an output current I_OUT, that is sent to light emitting diode (LED) 728. The opamp close loop regulation guarantees that the I_OUT is gained up and proportional to the I_REF_DRT.

Figure 8:
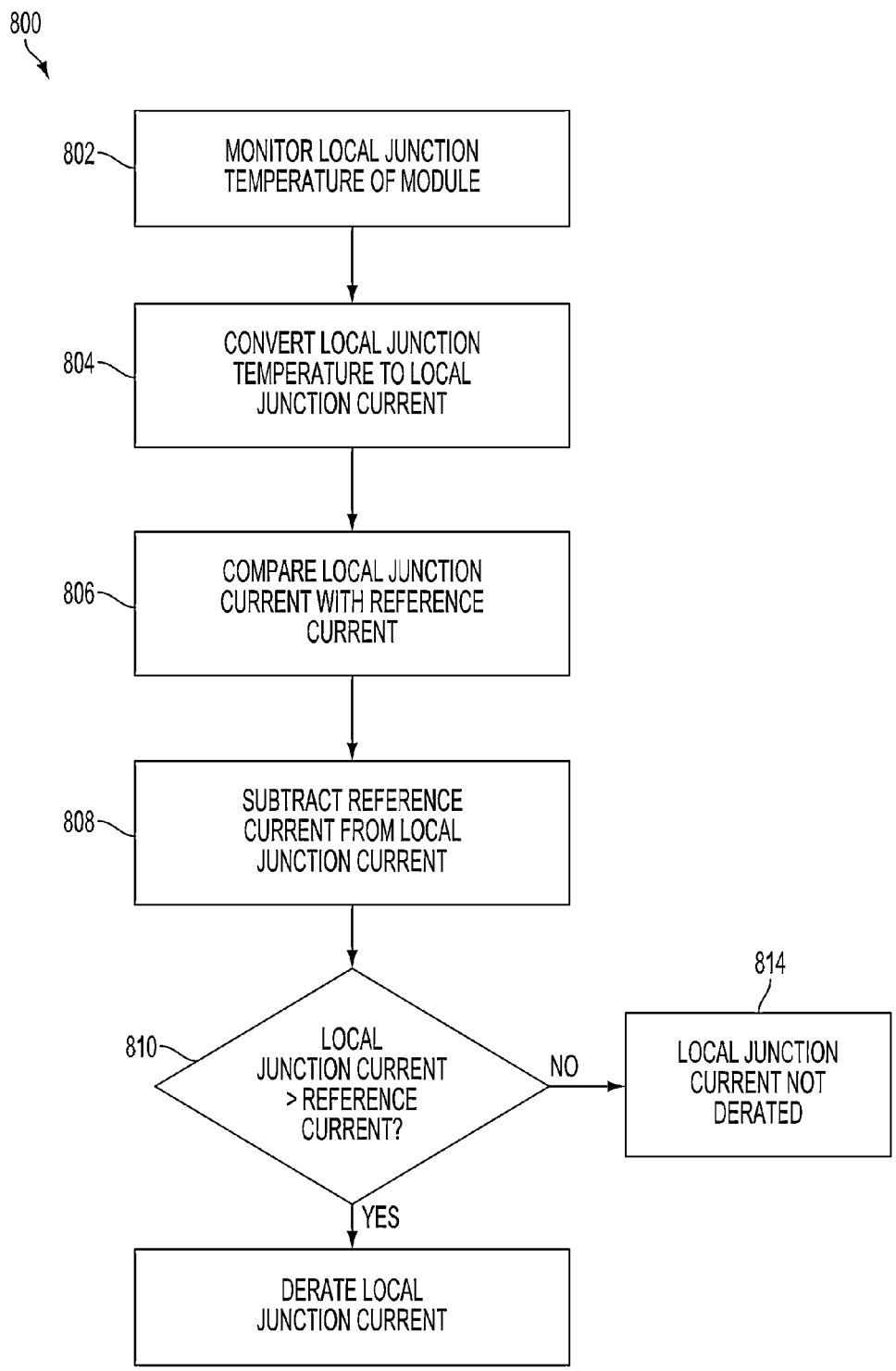
FIG. 8 is a flow chart of a method for current derating with integrated temperature sensing according to an embodiment of the invention.

FIG. 8 is a flow chart of a method of operation of the current derating apparatus with integrated temperature sensing. The method, 800, begins with the monitoring of a local junction temperature of a module in step 802. The local junction temperature is converted to a local junction current in step 804. The local junction current is then compared with a reference current in step 806. In step 808 the reference current is subtracted from the local junction current. In step 810 the determination is made as to whether the local junction current is greater than the reference current. If the local junction current is not greater than the reference current, the local junction current is not derated in step 814. If the local junction current is greater than the reference current, then in step 812, the local junction current is derated. The method ends with either step 812 or 814, when the current is or is not derated.

The embodiments disclosed and described herein provide a method of current derating with integrated temperature sensing. The disclosures provides for an automatic derating of current and a smooth current profile because the method directly uses the temperature sensing current as the derate control to simplify the design and also to provide an instant response. In addition, flexible control of derating is provided as both the derate temperature threshold and the derate slope may be programmed The die area and current consumption are small when compared with prior methods, allowing for easy integration with other designs. The method requires no external components.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for derating a current for a camera flash, comprising:
   monitoring a local junction temperature of a module;
   converting the local junction temperature into a local junction current, wherein the local junction current is a function of the local junction temperature and further wherein the local junction current is based on a proportional to absolute temperature;
   comparing the local junction current with a reference current, wherein the reference current is independent of temperature or a function of a reference temperature and the reference current is a zero temperature coefficient current;
   subtracting the reference current from the local junction current to generate the derate control current;
   determining a timing of a camera flash; and
   derating the local junction current if the local junction current is greater than the reference current at the time of the camera flash.

2. The method of claim 1, wherein the local junction current is not derated if the local junction current is not greater than the reference current.

3. The method of claim 1, wherein the reference current may be a predetermined threshold.

4. A non-transitory computer-readable medium containing instructions for derating current, that when executed, cause a processor to perform the following steps:
   monitoring a local junction temperature of a module;
   converting the local junction temperature into a local junction current, wherein the local junction current is a function of the local junction temperature and further wherein the local junction current is based on a proportional to absolute temperature;
   comparing the local junction current with a reference current, wherein the reference current is a function of a reference temperature and the reference current is a zero temperature coefficient;
   subtracting the reference current from the local junction current to generate the derate control current; and
   derating the local junction current if the local junction current is greater than the reference current.

5. The non-transitory computer-readable medium of claim 4, wherein the instructions further contain instructions for not derating the local junction current if the local junction current is not greater than the reference current.

6. The non-transitory computer-readable medium of claim 4, wherein the instructions further contain instructions that the reference current may be a predetermined threshold.

7. A non-transitory computer-readable medium containing instructions for derating a current for a camera flash, which when executed, cause a processor to perform the steps of:
monitoring a local junction temperature of a module;
converting the local junction temperature into a local junction current, wherein the local junction current is a function of the local junction temperature and further wherein the local junction current is based on a proportional to absolute temperature;
comparing the local junction current with a reference current, wherein the reference current is independent of temperature or a function of a reference temperature and the reference current is a zero temperature coefficient current;
subtracting the reference current from the local junction current to generate the derate control current;
determining a timing of a camera flash; and
derating the local junction current if the local junction current is greater than the reference current at the time of the camera flash.

8. The non-transitory computer-readable medium of claim 7, wherein the instructions further contain instructions for not derating the local junction current if the local junction current is not greater than the reference current.

9. The non-transitory computer-readable medium of claim 7, wherein the instructions further contain instructions that the reference current may be a predetermined threshold.

* * * * *